United States Patent [19]
Ferrara

[11] 3,823,442
[45] July 16, 1974

[54] EASY-ON BANDS FOR ROLLED MEATS

[76] Inventor: Rose S. Ferrara, 180 Christie St., Leonia, N.J. 07605

[22] Filed: Jan. 29, 1973

[21] Appl. No.: 327,600

[52] U.S. Cl.................. 24/16 R, 99/350, 24/30.5 R
[51] Int. Cl............................................. B65d 63/00
[58] Field of Search ................. 99/350, 351; 17/71; 24/17 B, 16 R, 30.5 R, DIG. 4; 206/DIG. 6; 277/230

[56] References Cited
UNITED STATES PATENTS

| | | | |
|---|---|---|---|
| 183,252 | 10/1876 | Colvin | 277/230 |
| 1,930,766 | 10/1933 | Moore | 277/230 |
| 1,973,646 | 9/1934 | Mix | 24/DIG. 4 |
| 2,051,360 | 8/1936 | Delmann | 99/351 |
| 2,147,771 | 2/1939 | Hathaway | 277/230 |
| 2,509,727 | 5/1950 | Davis | 99/350 |
| 2,699,585 | 1/1955 | Patterson | 24/16 PB |
| 2,859,061 | 11/1958 | Reid | 277/229 |

Primary Examiner—Bernard A. Gelak
Attorney, Agent, or Firm—James J. Cannon, Jr.; James J. Cannon

[57] ABSTRACT

This invention pertains to an improved means to hold rolled meats and rolled stuffed meats in a rolled shape for sale, cooking and subsequent slicing. It comprises an elastic band of a substance which will retain its full elasticity when exposed to oven temperatures up to 600° F or frying temperatures and a covering for said band comprised of standard butcher's thread. These thread covered bands, which come in various sizes, are stretched and placed over the rolled meat or rolled stuffed meat in place of conventional fastening means. These bands may be rinsed or washed and reused.

1 Claim, 3 Drawing Figures

EASY-ON BANDS FOR ROLLED MEATS

BACKGROUND OF THE INVENTION

1. Field of the Invention

Class 99, subclasses 350, 351, 426, 441

Class 24, subclass 16

This invention pertains to an improved device for fastening or holding rolled meats and rolled stuffed meats in a rolled shape for sale, cooking and subsequent slicing. It comprises an elasticized band covered with butcher's thread or the equivalent.

2. Description of the Prior Art

The use of rolled meats and rolled stuffed meats is quite common and well known. Deboned meats and thin cuts are frequently rolled to provide ease of cooking and tasty appearance for meats. In order to hold the meat in the desired rolled position from its original cutting through carving and serving, the butcher or chef ties the meat at several points, usually about an inch apart, with standard butcher's thread. This is a time consuming operation which is not easily amenable to automation in a meat processing facility. It is also susceptible to human errors involving improperly tied knots or improperly tightened thread, either of which will cause the rolled meat to become unrolled, cook improperly or carve poorly.

In addition, the preparation of many dishes such as veal birds and Italian Braciole requires that piece of meat be rolled around stuffing. In the past, either thread or toothpicks have been used to hold these dishes together. Both are unsatisfactory in use because they are inconvenient to use, don't hold well or are difficult to remove after cooking. The present invention is directed towards a solution to these problems by providing tight elastic bands in various sizes covered with butcher's thread or similar cloth covering which requires no tying and whose elastic properties will serve to hold the rolled meat tightly rolled.

The prior art discloses numerous holders or fasteners for various foods. Among these are U.S. Pat. No. 2,509,727 which teaches a roasting aid for meats; U.S. Pat. No. 2,092,711 which teaches a lobster muzzle; and French Patent No. 504,633 which teaches a set of metallic rings for bundling vegetables. U.S. Pat. No. 2,699,585 teaches a fastening device for foods, primarily for bundling foods for shipping and sale, rather than for cooking.

The present invention is an improvement over the prior art in that it provides a fastening means which is specifically adaptable for the cooking of meats. It combines the advantages of an elastic fastening means with the advantages of conventional butcher's thread. It is particularly useful in the preparation of delicate rolled stuffed meats.

Accordingly, it is the principal object of this invention to provide a simple and economical means for holding rolled meats and rolled stuffed meats together.

It is a further object of this invention to provide a means for holding rolled meats and rolled stuffed meats together which is simple to place on the rolled meat in preparation and easy to remove prior to eating.

SUMMARY OF THE INVENTION

This invention pertains to a device for holding rolled meats and rolled stuffed meats together and comprises an elasticized band made of a substance which will retain its full elasticity when subjected to temperatures up to 600° Fahrenheit or frying temperatures and covered with a tightly woven fabric such as butcher's thread. This band, which may be made in various sizes is used as a fastening or holding means for holding rolled meats or rolled stuffed meats in a rolled shape from first preparation through carving and serving. This band replaces conventional means of holding rolled meats together such as tying thread around the meat or inserting toothpicks into the meat. The cloth-covered elastic bands of this invention are simple to place on the rolled meats during preparation and easy to remove before eating. They may be rinsed or washed after one use and reused.

Other objects, features and advantages of this invention will become apparent to those skilled in the art by reading the following specification in relation to the accompanying drawings.

DESCRIPTION OF THE PREFERRED EMBODIMENT

Figure 1:
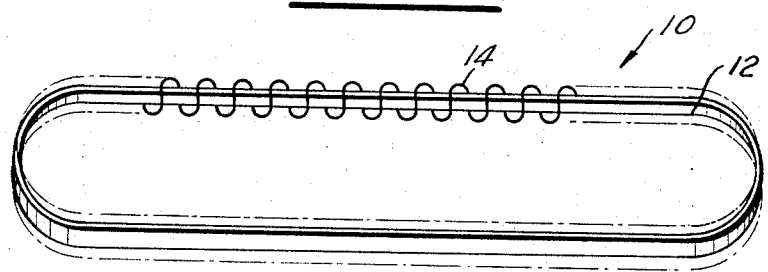
FIG. 1 is a front perspective view of the cloth-covered elastic band of this invention.
Figure 2:
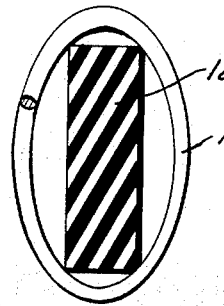
FIG. 2 is a cross-sectional view of the cloth-covered elastic band of this invention.

Referring now to the drawings, and in particular to FIG. 1, the reference numeral 10 denotes generally the cloth-covered elasticized band of the present invention. As illustrated in the cross-sectional view of FIG. 2, band 10 comprises a central core 12 of an elasticized substance which can withstand normal oven-cooking temperatures up to at least 600° Fahrenheit and normal frying temperatures.

Tightly wound around elasticized core 12 is a cloth covering 14. Covering 14 may simply be standard butcher's thread tightly wrapped around elasticized core 12. Covering 14 may also be a cloth having properties similar to butcher's thread which is tightly woven or knitted around core 12. In either case, covering 14 should be able to stretch without breaking when band 10 is stretched to be placed on a piece of rolled meat.

It should be noted that a common characteristic of butcher's thread or cord is that it is substantially inelastic.

Cloth-covered bands 10 may be made in various sizes to accomodate various sizes of rolled meats and rolled stuffed meats.

Figure 3:
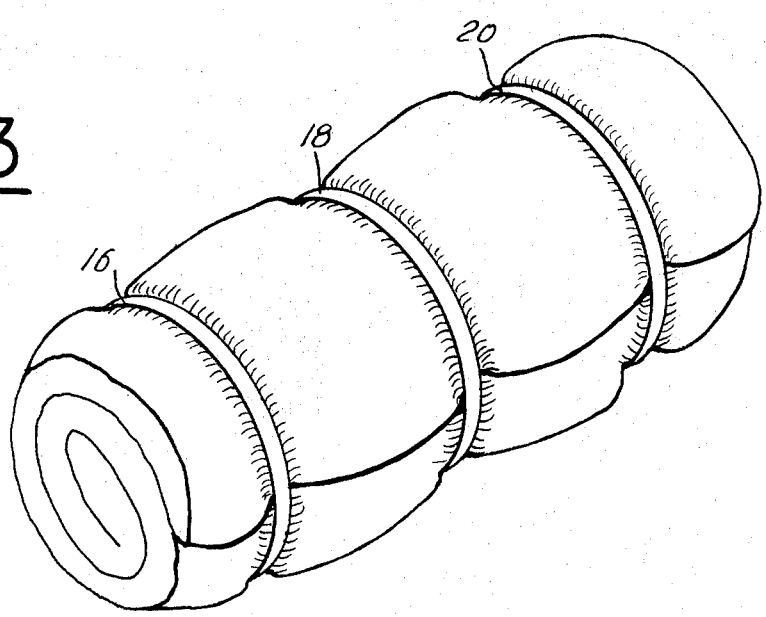
FIG. 3 is a perspective view of a piece of rolled meat held together by the cloth-covered elastic bands of this invention.

The use of bands 10 is illustrated in FIG. 3. After meat is rolled, either with or without stuffing, several bands 16, 18, 20, 22 are selected, each having a diameter slightly smaller than the diameter of the cross-section of the rolled meat where it will be placed. The bands 16, 18, 20, 22 are then stretched, placed around the piece of meat and then allowed to return to nearly normal shape. As they so return they hold the meat tightly in its rolled shape. Just prior to serving or eating, the bands are removed from the meat. These bands may be rinsed or washed after one use and reused.

The use of band 10 eliminates the cumbersome practice of tying meats together with butcher's thread and then cutting the thread before serving. It also eliminates the use of toothpicks on smaller sized pieces of rolled meat and the not infrequent failure to remove the toothpicks before eating. Band 10 is simple and convenient in use. It performs the function of holding rolled meats and rolled stuffed meats together more efficiently than was heretofore possible. It is useful in the home or restaurant kitchen.

Although only one embodiment of the cloth-covered elasticized band has been described, it should be obvious to those skilled in the art that many alterations and modifications may be made without departing from the principles of this invention. The invention, in brief, includes all the forms and embodiments coming within the scope and spirit of the appended claims.

I claim:

1. A device for holding rolled meats, rolled stuffed meats and various other foods in a rolled shape for cooking and serving comprising:
   A. an endless elastic band in the form of a closed loop of a substance which will retain its elasticity when subjected to normal oven cooking temperatures; and
   B. a covering tightly wrapped around said band covering its entire outer surface, said covering comprising a single run of substantially inelastic butcher's thread tightly coiled around said band whereby said coiled thread permits said band to stretch a substantial amount while preventing contact between said band and said foods.

* * * * *